Sept. 29, 1970     T. J. ENGLE ET AL     3,530,553
CONCRETE PIPE BELL DEPRESSION FORMER Filed March 17, 1967     2 Sheets-Sheet 1

INVENTORS
THOMAS J. ENGLE
RONALD P. KIRCHNER
BY KENNETH ATCHISON

*Farley, Forster and Farley*
ATTORNEYS

Sept. 29, 1970         T. J. ENGLE ET AL         3,530,553
         CONCRETE PIPE BELL DEPRESSION FORMER
Filed March 17, 1967                     2 Sheets-Sheet 2
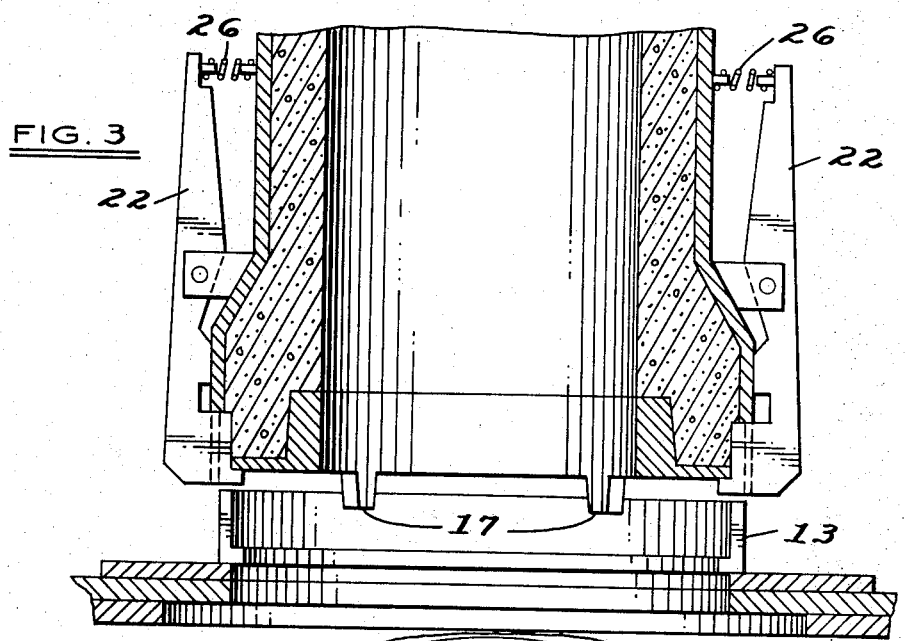
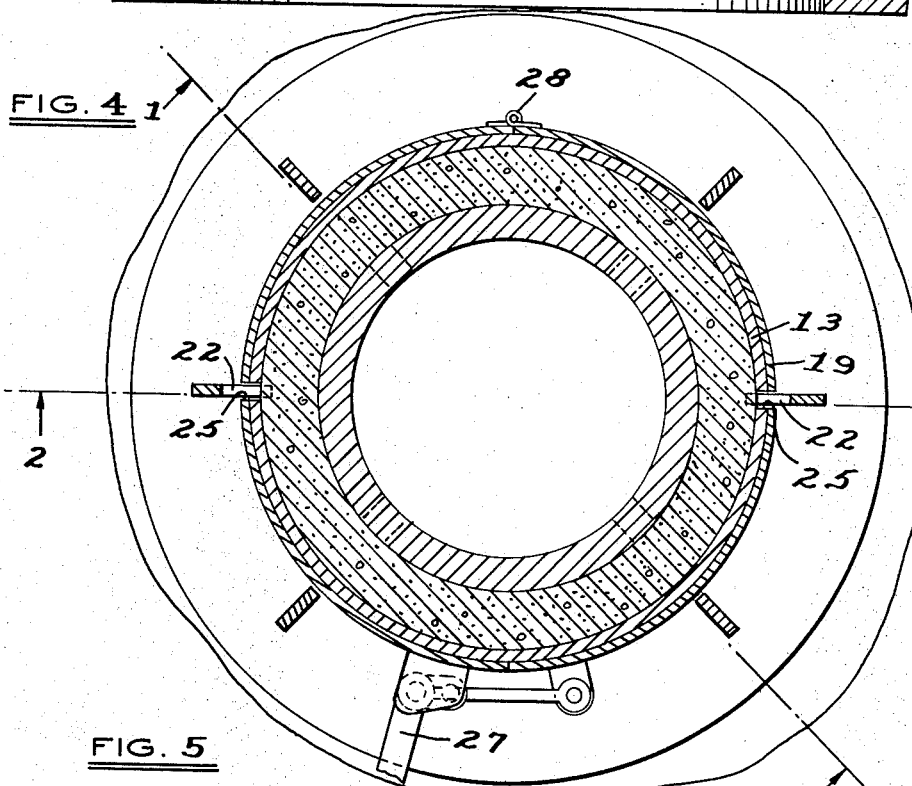
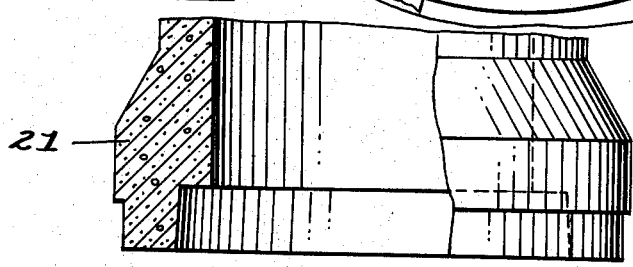
INVENTORS
THOMAS J. ENGLE
RONALD P. KIRCHNER
BY KENNETH ATCHISON
Farley, Forster
and Farley
ATTORNEYS

United States Patent Office

3,530,553
Patented Sept. 29, 1970

3,530,553
CONCRETE PIPE BELL DEPRESSION FORMER
Thomas J. Engle, 23511 Ditner Drive, Rockwood, Mich. 48173; Ronald P. Kirchner, 26421 Hass, Dearborn, Mich. 48127; and Kenneth Atchison, 15011 Lesure, Detroit, Mich. 48227
Filed Mar. 17, 1967, Ser. No. 626,912
Int. Cl. B28b *21/10*
U.S. Cl. 25—39                                    1 Claim

ABSTRACT OF THE DISCLOSURE

An improvement in the apparatus used for production molding the bell end of concrete pipe is described wherein the outer perimeter of the bell end of the pipe is formed with an annular depression for the purpose of protecting against corner chipping during stacking and unstacking operations.

---

This invention relates to an apparatus for forming an annular depression in the outer perimeter of the bell end of a section of concrete pipe for the purpose of protecting the same end against corner chipping during stacking and unstacking operations.

Concrete pipe is currently manufactured with an enlarged bell at one end, the other end being reduced for inner-engagement with a sealing gasket therebetween. The bell end presents an annular projection which in stacking pipe is vulnerable to corner chipping which, it has been found, can be substantially alleviated by providing a reduced diameter depression which will not contact adjacent pipe during stacking operations.

Concrete pipe is conventionally formed in vertical molding apparatus including a vertically split external jacket within which a packer head with rollers rotates after filling the surrounding void between the packer head and closed jacket with concrete aggregate. The rotating packer head is withdrawn vertically forming and packing the internal pipe wall as its progresses leaving the formed uncured pipe within the jacket which is moved to a curing location, opened, and stripped from the pipe.

A "bell-down" molding procedure is currently preferred over the earlier "bell-up" process because it provides more efficient overhead stripping and higher quality bells. A pallet is provided for the lower bell end which remains as a support after removal of the jacket and during cure of the pipe.

In accordance with the present invention a depression forming ring is provided as a part of the permanent base installation within which the pallet is placed and against which the outer jacket registers during forming of the concrete pipe. Immediately after forming, the pipe is raised vertically with the pallet and jacket intact, stripping the lower end of the pipe from the fixed depression forming ring, and removed to the curing location. The method and apparatus by which this is accomplished will best be understood by reference to the following description of a preferred embodiment of the invention and disclosed in the drawings wherein:

FIG. 3 is a section elevation similar to FIG. 2 showing removal of the pipe jacket and pallet from the base ring;

FIG. 4 is a sectional plan view taken along the line 4—4 of FIG. 2; and

FIG. 5 is a partially sectioned fragmentary view of the bell and of a completed pipe after removal of jacket and pallet.

Figure 1:
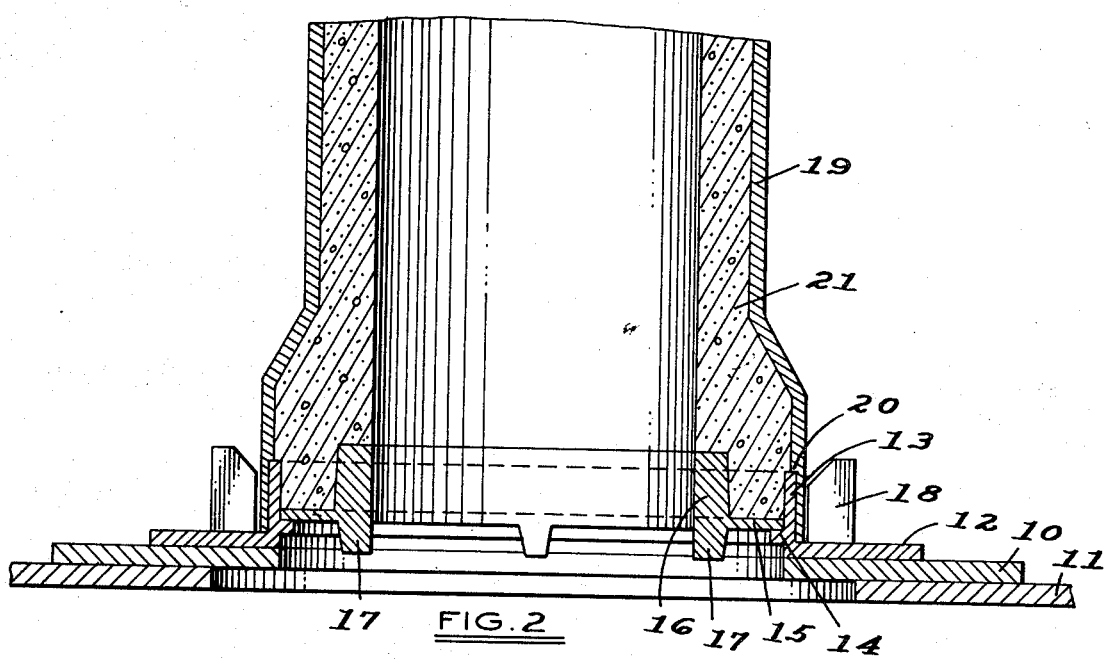
FIG. 1 is a sectional elevation of the lower end of a pipe forming jacket in place on the fixed base taken along section line 1—1 of FIG. 4.

Referring to FIG. 1 the elements of the pipe forming apparatus include a base plate 10 supported on a floor plate 11, a fixed depression forming ring plate 12 mounted on the base plate 10 having a depression forming annular flange ring 13 projecting upwardly and an internal horizontal ledge 14 adapted to support the outer perimeter of an annular pallet 15 having an upwardly extending annular shoulder 16 and a plurality of downwardly extending lug feet 17.

A plurality of beveled guides 18 serve to center the outer pipe forming jacket 19 when lowered over the ring 13 to a position where a shoulder 20 of its counterbored end engages the upper end of the ring 13. The counterbored end of the jacket closely fits against the outer wall of the ring 13 when the jacket is closed to provide for accurate nesting of the jacket, ring and pallet during formation of the concrete pipe 21 by a rotating packer head, not shown, forming and packing the cylindrical inner wall of the pipe while all parts of the molding apparatus are in the position shown in FIG. 1.

Figure 2:
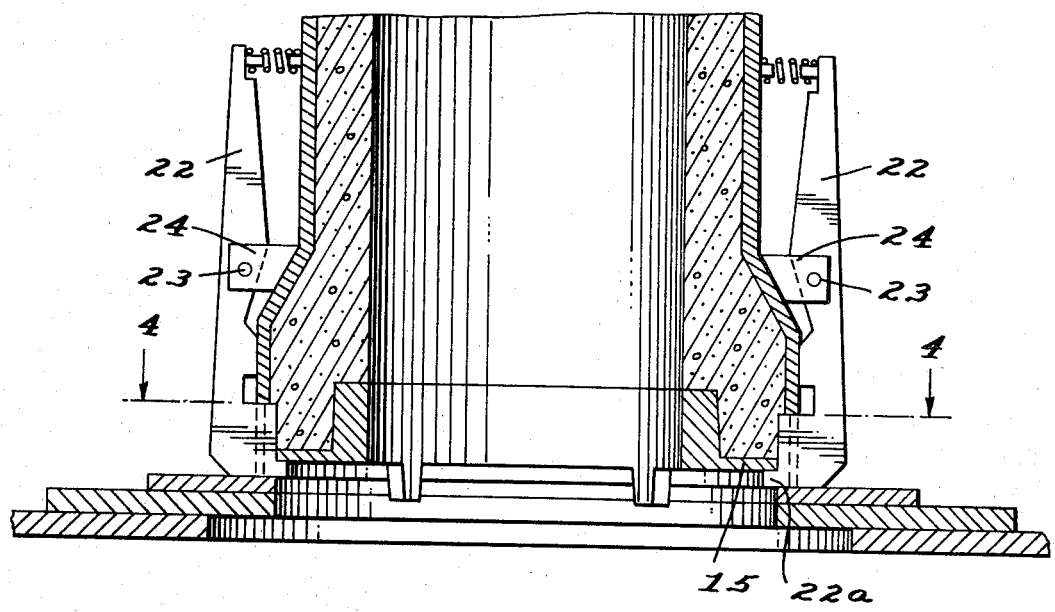
FIG. 2 is a similar sectional elevation taken along the line 2—2 of FIG. 4.

Referring to FIG. 2 a pair of latch elements 22 pivoted at 23 to brackets 24 mounted on the jacket 19 project through a pair of slots 25, best shown in FIG. 4, formed in the lower end of the jacket 19 and adjacent a portion of the ring 13, the latches having finger portions 22*a* projecting under the pallet 15 to engage and raise the same when the jacket is removed from the ring 13 after formation of the pipe 21, thereby stripping the pipe from the ring 13 as best shown in FIG. 3. Upon removal of the pipe to a curing area, the lug feet 17 of the pallet engage the floor, the latches 22 are opened against compression springs 26, toggle clamps 27 are actuated to open the jacket 19, vertically hinged along one side at 28, and the jacket is stripped leaving the pipe 19 on the pallet 15 until it is cured, whereupon the pallet is removed from the bell end of the pipe, cleaned and returned to the fixed ring 13 for further use.

While a preferred method of forming a protective depression in the bell end of concrete pipe and apparatus for performing same have been disclosed and described above in detail it will be understood that numerous modifications might be resorted to without departing from the scope of the invention as defined in the following claims.

We claim:

1. Apparatus for forming a protective depression in the outer bell end perimeter of concrete pipe characterized by a bell end forming apparatus including a fixed annular flange ring for forming said bell depression, an annular pallet within said ring having an upwardly extending relatively wide inner annular shoulder for forming the terminal end surface of said pipe and adapted for supporting said pipe during curing, a jacket for forming the external surface of said pipe and means to facilitate the removal of said pipe with said jacket and pallet in place from said fixed ring, including latch means mounted on said jacket adapted to engage said pallet, and alignable slots in said jacket and fixed ring accommodating latch passage to engage said pallet.

References Cited

UNITED STATES PATENTS

| | | | |
|---|---|---|---|
| 2,684,517 | 7/1954 | Woods. | |
| 3,276,091 | 10/1966 | Pausch. | |
| 3,341,910 | 9/1967 | Hesselholt | 25—39 |
| 3,083,433 | 4/1963 | Tiller | 25—39 |

ROBERT D. BALDWIN, Primary Examiner